(12) United States Patent
Sobel

(10) Patent No.: US 10,286,346 B2
(45) Date of Patent: May 14, 2019

(54) THREE DIMENSIONAL FILTER MEDIA FOR EXTENDED LIFE FILTER

(71) Applicant: Martin Sobel, Flemington, NJ (US)

(72) Inventor: Martin Sobel, Flemington, NJ (US)

( * ) Notice: Subject to any disclaimer, the term of this patent is extended or adjusted under 35 U.S.C. 154(b) by 0 days.

(21) Appl. No.: 15/360,293

(22) Filed: Nov. 23, 2016

(65) Prior Publication Data
US 2018/0140982 A1    May 24, 2018

(51) Int. Cl.
*B01D 46/00* (2006.01)
*B01D 39/08* (2006.01)
*B01D 46/40* (2006.01)

(52) U.S. Cl.
CPC ......... *B01D 39/083* (2013.01); *B01D 46/40* (2013.01); *B01D 2239/0609* (2013.01); *B01D 2239/0613* (2013.01); *B01D 2239/1291* (2013.01)

(58) Field of Classification Search
CPC ............. B01D 39/83; B01D 2239/609; B01D 2239/613; B01D 2239/1291; B01D 46/00; B01D 46/0027–46/0038; B01D 46/40–46/406; B01D 46/54–46/546; B01D 2239/06–2239/0613; B01D 39/08–39/086
USPC ............................ 55/522–528; 95/273–287
See application file for complete search history.

(56) References Cited

U.S. PATENT DOCUMENTS

| | | | |
|---|---|---|---|
| 3,478,498 A | 11/1969 | Sauermann | |
| 3,828,934 A * | 8/1974 | Green | B01D 29/111 210/457 |
| 3,830,042 A | 8/1974 | MacDonnell | |
| 4,906,265 A | 3/1990 | Berfield | |
| 5,069,696 A | 12/1991 | Bruno | |
| 5,308,369 A | 5/1994 | Morton et al. | |
| 5,308,485 A | 5/1994 | Griffin et al. | |
| 5,308,508 A | 5/1994 | Womack | |

(Continued)

FOREIGN PATENT DOCUMENTS

| | | | |
|---|---|---|---|
| GB | 1178472 | * | 1/1970 |
| GB | 1178472 A | | 1/1970 |
| WO | 199826925 A1 | | 6/1998 |

OTHER PUBLICATIONS

WIPO, International Search Report and Written Opinion issued in counterpart Application No. PCT/US2017/063156, dated Feb. 13, 2018, 7 pages.

*Primary Examiner* — T. Bennett McKenzie
(74) *Attorney, Agent, or Firm* — Loza & Loza, LLP; Michael I. Angert

(57) ABSTRACT

A three dimensional filter media for extended life filters includes:
(a) a filter media base made of fabric selected from the group consisting of synthetic fabric, natural fabric and combinations thereof, the fabric being made of a plurality of threads, each of the plurality of threads being formed by a plurality of joined twisted thread filaments, the fabric being selected from the group consisting of woven fabric, knitted fabric, and combinations thereof, the fabric having a thickness of Z in the range of 0.020 to 0.075 inch, the fabric having a specified density; and, (b) a plurality of mechanical cilia connected to and protruding outwardly and away from the base, the cilia having a length that is at least 10 times Z, Z being the thickness of the base set forth above, and having a density that is no greater than 5% of the density of the base.

10 Claims, 9 Drawing Sheets

PRESENT INVENTION WOVEN OR KNITTED
FILTER MEDIA WITH EXTENDED CILIA
(Suspended Dust and Debris)

(56) References Cited

U.S. PATENT DOCUMENTS

| | | | |
|---|---|---|---|
| 5,443,606 A * | 8/1995 | Hassenboehler, Jr. | B01D 39/163 55/486 |
| 5,753,736 A * | 5/1998 | Bhat | C08L 67/02 264/211.14 |
| 5,783,086 A | 7/1998 | Scanlon et al. | |
| 5,855,634 A | 1/1999 | Berfield | |
| 6,110,248 A | 8/2000 | Liu | |
| 6,113,663 A | 9/2000 | Liu | |
| 6,428,610 B1 | 8/2002 | Tsai | |
| 8,206,482 B2 | 6/2012 | Williams | |
| 8,533,906 B2 | 9/2013 | Liu | |
| 8,956,435 B2 | 2/2015 | Apello | |
| 9,161,667 B2 | 10/2015 | Sobel | |
| 2004/0132370 A1* | 7/2004 | Schroder | B01D 39/083 442/313 |
| 2005/0081341 A1* | 4/2005 | McDougall | A44B 18/0034 24/445 |
| 2009/0036016 A1* | 2/2009 | Robertson | D04H 3/04 442/353 |
| 2009/0255404 A1 | 10/2009 | Ptak et al. | |
| 2010/0312211 A1* | 12/2010 | Bond | A61F 13/5376 604/378 |
| 2011/0083686 A1* | 4/2011 | Yang | A24D 3/0204 131/328 |
| 2012/0279185 A1 | 11/2012 | Appelo | |
| 2013/0193222 A1* | 8/2013 | Carels | E01B 3/46 238/84 |
| 2014/0041151 A1* | 2/2014 | Ford | A47L 9/1691 15/353 |
| 2014/0311107 A1* | 10/2014 | Sobel | A47L 9/127 55/379 |
| 2015/0135668 A1 | 5/2015 | Seeberger | |

* cited by examiner

PRIOR ART PAPER OR CLOTH FILTER
(Trapped Dust And Debris)

PRESENT INVENTION WOVEN OR KNITTED FILTER MEDIA WITH EXTENDED CILIA
(Suspended Dust and Debris)

Prior Art – Woven
Also Present Invention Backside Without Cilia

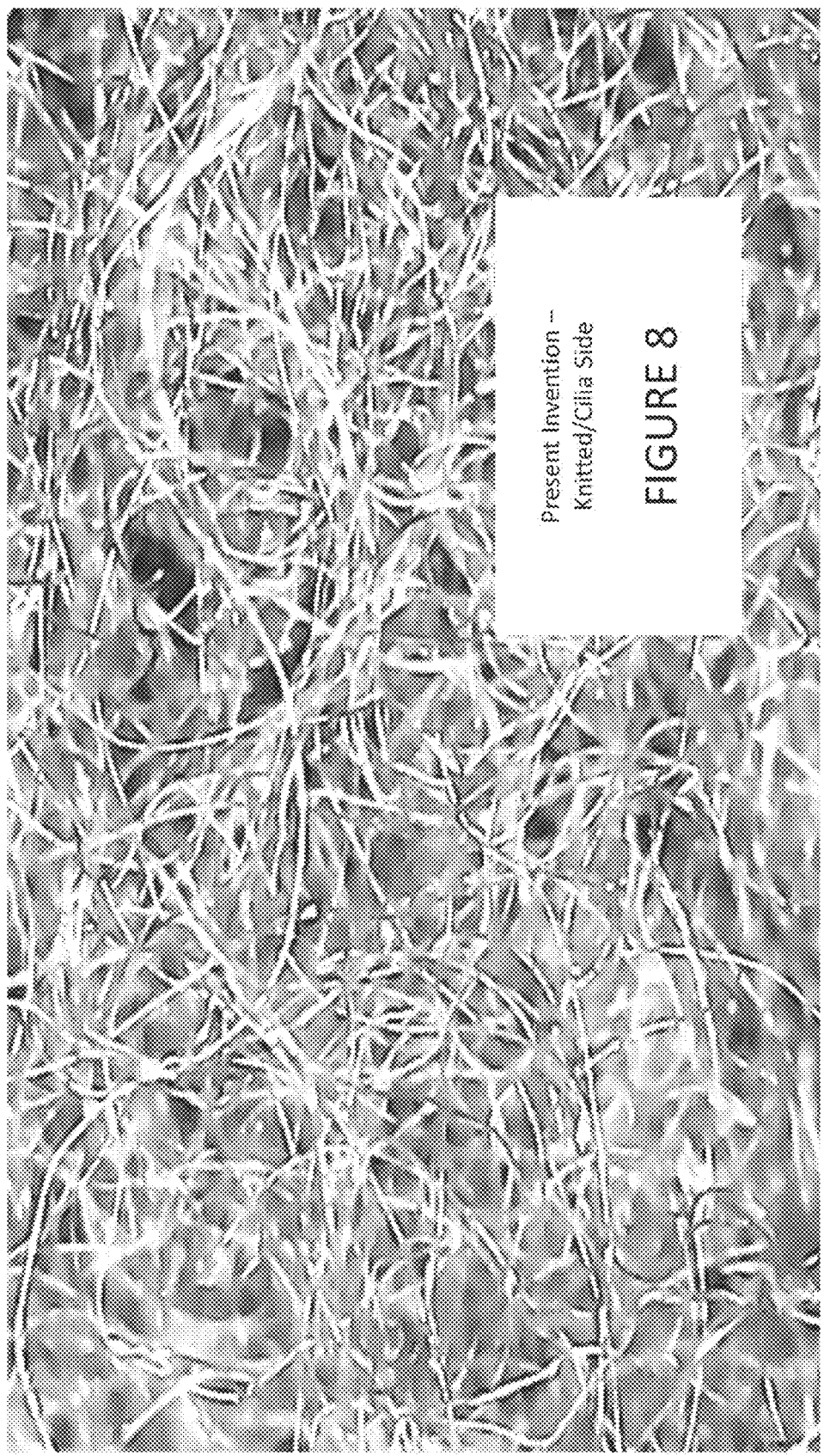

THREE DIMENSIONAL FILTER MEDIA FOR EXTENDED LIFE FILTER

REFERENCE TO RELATED APPLICATION(S)

This application is not related to any currently co-pending applications.

FIELD OF THE INVENTION

The present invention relates to filters.

BACKGROUND OF INVENTION

The following patents and applications are representative of various types of vacuum cleaners and filter systems:

United States Patent Application No. 2012/0279185 A1 to Appelo describes a vacuum cleaner primary filter cage wall element that is adapted to form, together with at least one complementary filter cage wall element, a tubular bag-house filter cage segment. The filter cage wall elements are provided with snap-locks, for snapping a first long side of the primary filter cage wall element to a secondary long-side of the complementary filter cage wall element, and for snapping a secondary long side of the primary filter cage wall element to a first long side of the complementary filter cage wall element.

U.S. Pat. No. 8,533,906 B2 to Liu describes vacuum cleaner comprising a receptacle having a working air inlet and an associated filter, the filter in communication with and downstream from the working air inlet, is disclosed. The vacuum cleaner further includes a housing containing a motor and having a cooling air outlet from the motor and a working air outlet, the working air outlet in communication with the working air inlet of the receptacle through a working air impeller, wherein the cooling air is directed to the receptacle, and the cooling air passes through the filter before exiting the working air outlet of the housing.

U.S. Pat. No. 8,206,482 B2 to Williams et al. describes vacuum cleaner filters, in particular replaceable vacuum cleaner filters suitable for both dry and wet/dry type vacuum cleaners, as well as systems incorporating the use of such filters and methods for their use. The filters include a plurality of adjacently positioned pleats arranged in a closed circumferential, cylindrically-shaped path, a top end cap having a central orifice capable of constricting a post on a vacuum filter cage, and optionally a molded end ring oppositely-spaced from the top end cap for engagement with the motor housing of a vacuum cleaner.

U.S. Pat. No. 6,428,610 B1 to Tsai et al. describes a filter media for a high efficiency particulate air ("HEPA") filter including a multiplicity of adjacent electrostatically charged piles of nonwoven fabric. The invention further includes a method of making a HEPA filter.

U.S. Pat. No. 6,113,663 to Liu describes a vacuum cleaner having a dual filter assembly includes a filter cage, a primary filter disposed on the filter cage, and a secondary filter disposed downstream of the primary filter. A float valve between the primary filter and the secondary filter inhibits liquid from coming into contact with the secondary filter.

U.S. Pat. No. 6,110,248 to Liu at al. describes a dual filter assembly for a vacuum cleaner that includes an annular inner filter mountable on a filter cage of the vacuum cleaner. The inner filter has a lower end and a retaining ring is attached to the lower end. An annular outer filter is removably mounted surrounding the inner filter, with a lower end of the outer filter supported by the retaining ring.

U.S. Pat. No. 5,855,634 to Berfield describes a filter retainer for a vacuum cleaner that includes a filter cage having several ribs. At the bottom of the filter cage is a lip which includes a plurality of notches. A cylindrical filter having open ends is slid over the filter cage. A cap is placed at the bottom of the filter in order to hold the filter to the filter cage. The cap has a pair of ramps which engage notches on the rim of the filter cage. As the cap is rotated, the cap is pushed towards the filter so that a lip on the cap engages a bottom of the filter.

U.S. Pat. No. 5,783,086 to Scanlon et al. describes an improved method of employing a wet/dry vacuum cleaner for wet material pick-up. By employing a hydrophobic and air permeable filter material, such as an expanded polytetrafluoroethylene (PTFE), with a tight gasket around its edge in a place of a conventional wet/dry vacuum filter, it has been determined that the filter can be retained in place at all times during operation, regardless of the material being collected.

U.S. Pat. No. 5,308,485 to Griffin et al. describes a filter assembly for use in a bag-house having a cell plate provided with openings. The filter assembly includes a collar, filter bag, tubular supporting cage and locking ring. The filter bag filters particulate material and extends from below the cell plate. The collar supports the filter bag and has a longitudinally extended portion and a flange portion. The longitudinally extended portion is affixed to the filter bag below the cell plate, while the flange portion extends along the cell plate as a rim above a respective opening. The collar acts as a gasket to seal a respective opening in the cell plate. The tubular supporting cage has a longitudinally extended portion that structurally supports the filter bag. The locking ring is integrally fixed to the supporting cage and locks an arrangement of the filter bag, collar and cage in place. The locking ring also can include a venturi affixed thereto to assist in filtering and cleaning operations.

U.S. Pat. No. 5,308,369 to Morton et al. describes a cylindrical filter bag including a wire mesh cage with an access opening in the cage proximate to the open end of the filter bag. A resilient snap band is provided around the outer circumference of the cylindrical filter bag. The snap band includes a pair of felt rings formed around the band and an annular groove between the rings. The snap band thus provided can be depressed into the access opening in the wire mesh cage to allow the filter bag to be readily positioned in an airtight manner within a circular hole provided in the tube sheet of a dust collector. The hole in the tube sheet is provided with a collar having a radially extended flange portion that is attached to the top surface of the tube sheet to center the collar above the hole. The wire tube mesh cage of the filter bag is further provided with a reinforcing sleeve that mates with the tube sheet collar, and a venturi that is positioned concentrically within the sleeve.

U.S. Pat. No. 5,069,696 to Bruno describes a shop type vacuum cleaner including an externally mounted filter including a filter housing including a filter element and an elongated inlet tube slidably received within an exhaust outlet opening from the vacuum cleaner debris compartment.

U.S. Pat. No. 4,906,265 to Berfield describes installing a dry material paper filter on the filter cage of an electric vacuum cleaner, a disk of porous paper filtering material or of cloth type fabric, laid over the panel enclosing the bottom of the filter cage and a ring is pressed up over the paper or cloth filter and over the panel. As the ring is drawn up over the filter cage, it folds and presses the paper or cloth filter around the filter cage. At the top of the filter cage, the ring secures the filter to the cage. An additional filtering sleeve may be disposed around the filter cage before the filter is installed over the cage and over the sleeve with the attachment ring. The sleeve may be of foam or other wet material filtering material. The filter installed with the ring is of dry filtering material, like paper or cloth. A marking or disk at the center of the filter helps a user place the filter over the filter cage before the ring is used to fold the filter into place.

U.S. Pat. No. 3,830,042 to MacDonnell describes a disposable filter bag for the intake air housing of a locomotive that has a generally rectangular box-shaped extended configuration and is of pliable sheet stock of full flow depth filter material to be collapsible for folding into compact form. The bag is mounted between external and internal cage-like frames that stabilize the extended configuration of the bag.

U.S. Pat. No. 3,478,498 to Sauermann describes a filter that comprises a frame and a filter element carried by the frame to define therewith an internal chamber. The filter element consists of two apertured supporting layers and a filter layer of fibrous filter material sandwiched therebetween. A plurality of supporting bars is located in the internal chamber and engages the inner surfaces of the filter element. A plurality of deflecting bars engage the outer surfaces of the filter element intermediate the reinforcing bars and deflect the filter element intermediate such reinforcing bars inwardly into the chamber.

U.S. Pat. No. 9,161,667 to Sobel describes a filter kit with an enhanced surface area filter and cage, for an electric power vacuum cleaner. The filter is a self-cleaning, flexible interlocking fabric having a rest position at atmospheric pressure, and a stretched position when under vacuum of a vacuum cleaner, the fabric having at least enough stretchability to increase its surface area by at least 10% in its stretched position from its rest position. When the vacuum cleaner is operating, the filter is in its stretched position and collects dust and debris, and when the vacuum cleaner is off, the filter relaxes, returns to its rest position and its surface area contracts to be self-cleaning, and a portion of the dust and debris to fall from the filter.

Notwithstanding the prior art, the present invention is neither taught nor rendered obvious thereby.

SUMMARY OF INVENTION

The present invention is directed to three dimensional filter media that may be used in many different filter environments. Although not so limited, these uses include vacuum cleaners, shop-vacs, home, recreation vehicle and other filtering systems, commercial, industrial and institutional HVAC systems and other filtering devices and systems. They may be used to supplement (add to) or to replace the filters of embodiments just described and many other uses are contemplated, including chemical filters, gas masks, fire and emergency filtering mechanisms, etc. Unlike existing filters whether spun, woven, grid, paper, cloth, metal or electrostatic, the present invention filters are truly three dimensional with extremely elongated filter cilia on one or both sides of a thin base of woven or knitted fabric. These cilia extend in length at least ten times and preferably at least twenty times the thickness of the base, they are sparse enough to account for a small fraction of the total density or height of the present invention filter media. They last longer than conventional filters when in continuous use and are machine washable, and thus offer an even greater extended life.

The present invention is directed to a three dimensional filter media for extended life filters, which includes: (a) a filter media base made of fabric selected from the group consisting of synthetic fabric, natural fabric and combinations thereof, the fabric being made of a plurality of threads, each of the plurality of threads being formed by a plurality of joined twisted thread filaments, the fabric being selected from the group consisting of woven fabric, knitted fabric, and combinations thereof, the fabric having a thickness of Z, wherein Z is in the range of 0.020 to 0.075 inch, the fabric having a density D, including interstices, wherein D is in the range of 0.25 to 0.50 gms/cubic inch; and, (b) a plurality of mechanical cilia connected to and protruding outwardly and away from the base, the cilia having a length that is at least 10 times Z, Z being the thickness of the base set forth above, and having a density that is no greater than 5% of D, D being the density of the base set forth above.

In some embodiments of the present invention three dimensional filter media for extended life filters, the filter media base and the mechanical cilia are made of synthetic fabric selected from the group consisting of polyester, polypropylene, polyethylene, polyvinyl chlorides and combinations thereof.

In some embodiments of the present invention three dimensional filter media for extended life filters, the base is a knitted fabric.

In some embodiments of the present invention three dimensional filter media for extended life filters, the cilia are one end severed filaments of the base.

In some embodiments of the present invention three dimensional filter media for extended life filters, the cilia have a length of at least 20 times Z, wherein Z is the thickness of the base set forth above.

In some embodiments of the present invention three dimensional filter media for extended life filters, the cilia have a density that is no greater than 2% of D, D being the density of the base set forth above.

In some embodiments of the present invention three dimensional filter media for extended life filters, the cilia are non-parallel and create passage areas in the range of one micron to 0.2 inch.

In some embodiments of the present invention three dimensional filter media for extended life filters, the cilia are non-parallel and create passage areas in the range of one micron to 0.01 inch.

In some embodiments of the present invention three dimensional filter media for extended life filters, the cilia have an average length of 0.065 to 0.3 inch.

In some embodiments of the present invention three dimensional filter media for extended life filters, the cilia are located on only one side of the base.

In some embodiments of the present invention a method of removing airborne contaminants from an airflow stream which includes: A) providing a three dimensional filter media in a filter and positioning the filter in a path of the airflow stream, the three dimensional filter media including: (a) a filter media base made of fabric selected from the group consisting of synthetic fabric, natural fabric and combinations thereof, the fabric being made of a plurality of threads, each of the plurality of threads being formed by a plurality of joined twisted thread filaments, the fabric being selected from the group consisting of woven fabric, knitted fabric, and combinations thereof, the fabric having a thickness of Z, wherein Z is in the range of 0.020 to 0.075 inches, the fabric having a density of D, including interstices, wherein D is in the range of 0.25 to 0.50 gms/cubic inch; and, (b) a plurality of mechanical cilia connected to and protruding outwardly and away from the base, the cilia having a length that is at least 10 times Z, Z being the thickness of the base set forth above, and having a density that is no greater than 5% of D, D being the density of the base set forth above: and, B) capturing a portion of the contaminants on the cilia away from the base and capturing another portion of the contaminants on the base, so as to allow extended use of the filter to capture airborne contaminants.

In some embodiments of the present invention method of removing airborne contaminants from an airflow stream, the filter media base and the mechanical cilia are made of synthetic fabric selected from the group consisting of polyester, polypropylene, polyethylene, polyvinyl chlorides and combinations thereof.

In some embodiments of the present invention method of removing airborne contaminants from an airflow stream, the base is a knitted fabric.

In some embodiments of the present invention method of removing airborne contaminants from an airflow stream, the cilia are one end severed filaments of the base.

In some embodiments of the present invention method of removing airborne contaminants from an airflow stream, the cilia have a length of at least 20 times Z, wherein Z is the thickness of the base set forth above.

In some embodiments of the present invention method of removing airborne contaminants from an airflow stream, the cilia have a density that is no greater than 2% of D, D being the density of the base set forth above.

In some embodiments of the present invention method of removing airborne contaminants from an airflow stream, the cilia are non-parallel and create passage areas in the range of one micron to 0.2 inch.

In some embodiments of the present invention method of removing airborne contaminants from an airflow stream, the cilia are non-parallel and create passage areas in the range of one micron to 0.01 inch.

In some embodiments of the present invention method of removing airborne contaminants from an airflow stream, the cilia have an average length of 0.065 to 0.3 inch.

In some embodiments of the present invention method of removing airborne contaminants from an airflow stream, the cilia are located on only one side of the base. In other embodiments, the cilia are located on both sides of the base. In some embodiments of the present invention vacuum cleaner two stage filter system, the secondary filter has fabric that includes continuous filaments and cut filaments to create a brushed fabric.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 7 is a front view of one side of a present invention filter media knitted fabric, being the uncut (non-cilia) side of a present invention three dimensional filter media on which the opposite side, shown in FIG. 8 below, contains the cilia;

FIG. 8 is the opposite side view of the present invention three dimensional filter media shown in FIG. 7 wherein the in-focus cilia are more than twenty times longer than the thickness of the out-of-focus knitted base behind the cilia; and, FIGS. 9 and 10 show present invention three dimensional filter media cilia prior to use and after many uses, respectively, wherein the well used media of FIG. 10 has collected gypsum board powder at interstices in front of and away from the base and within the random three dimensional "spaghetti" cilia, thus showing large majority of flow space remaining open after many uses.

DETAILED DESCRIPTION OF THE EMBODIMENTS

Figure 1:
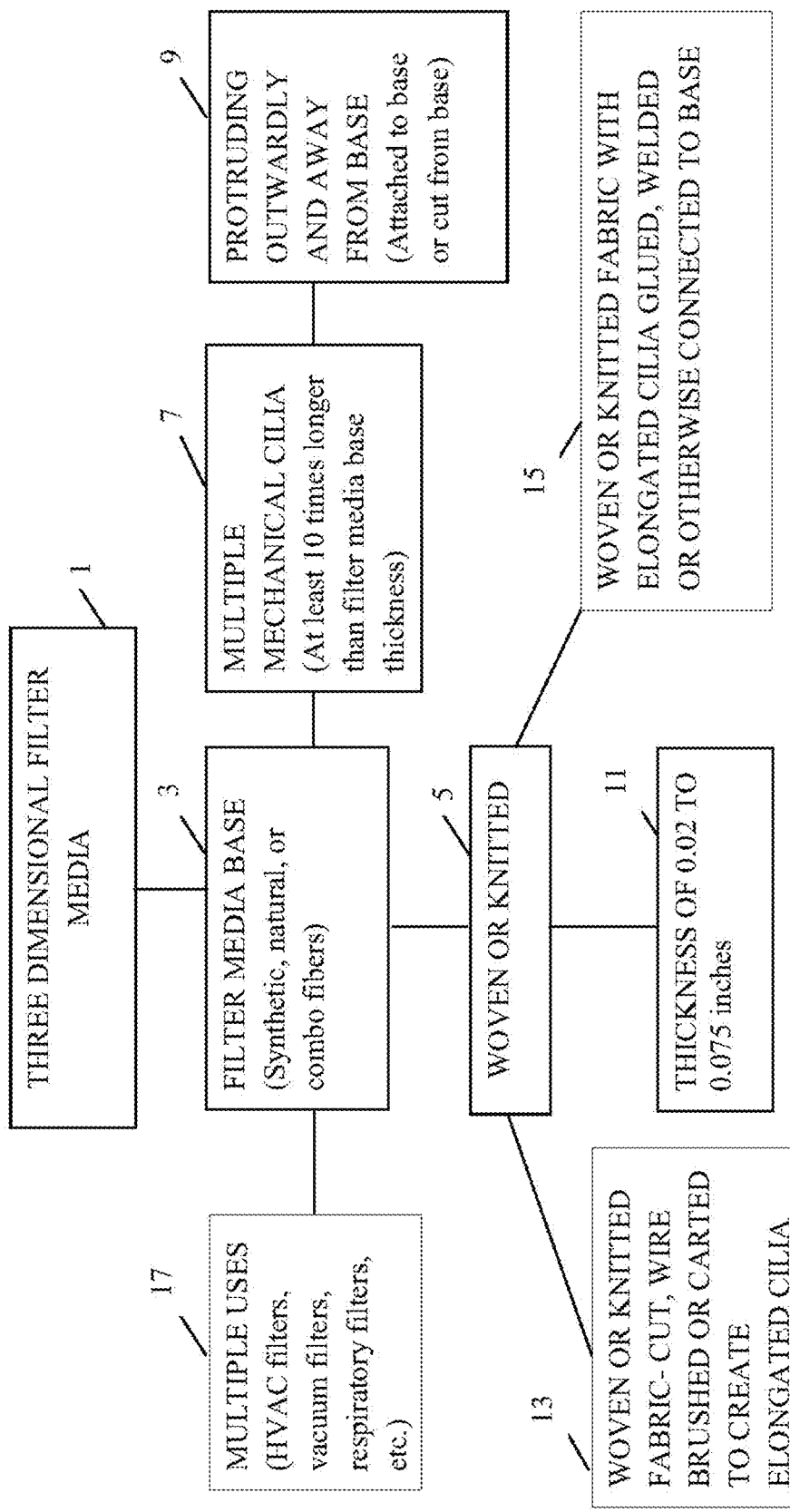
FIG. 1 is a block diagram of some embodiments of the present invention, setting forth the parameters of some present invention three dimensional filter media for extended life filters.

The present invention is directed to three dimensional filter media that may be used in many different filter environments, including vacuum cleaners, shop-vacs, home, recreation vehicle and other filtering systems, commercial, industrial and institutional HVAC systems and other filtering devices and systems. They may be used to supplement (add to) or replace the filters of embodiments just described and many other uses are contemplated, including chemical filters, gas masks, fire and emergency filtering mechanisms, etc. Unlike existing filters whether spun, woven, grid, paper, cloth, metal or electrostatic, the present invention filters are truly three dimensional and thus offer extended life. They capture particles away from the base so as to allow significant air flow after many more uses than their equivalent filter materials without elongated cilia. Further, once the air flow pressure or vacuum has been stopped the particles tend to fall away from the present invention cilia. Further, these present invention media can easily be shaken and used "like new" or almost "like new". In addition, there is an electrostatic feature in many instances of the present invention devices and methods. Specifically, air flow may enter conduits or hoses for air movement through the filter media. These conduits can build up charge by attracting electrons, and the elongated cilia-containing filter media can likewise attract electrons from the air. The airborne contaminants, such as dust and debris, become positively charged and will carry a charge across filter media. Thus much of these contaminants will be held by the static opposing charges. As soon as the air flow is stopped, the charge dissipates and much of the debris falls off the filter. This is known as triboelectric effect, caused by frictional contact between different materials. The triboelectric effect is not important or noticeable with other (prior art) filter media because the debris becomes entrapped as it reaches the potentially charged filter grid, and therefore when the charge dissipates, the entrapped debris does not fall off. In the present invention media the elongated (very elongated-10, 20 or more times longer than the thickness of the base) cilia are charged floaters that attract and suspend debris until the debris falls. This is an important feature of present invention filter media that is not found or even possible in prior art paper, metal or even cloth filters. Finally, and very significantly, these present invention filter media are environmentally friendly because they can be repeatedly washed in any washing machine and reused.

In addition to the foregoing, the present invention filter media have the unique characteristic of truly having variable density. It can be said that spun filters that comprise layers of fiberglass or other random spun filaments have variable density in the sense that if one were to take density measurements at various points about the filter, different density results would probably be obtained. However, present invention filter media have a very light density portion with a "step-function" change to a very high density portion at the interface between the cilia and the media base. This drastic variation in density is not found in any prior art filters and affords the present invention filter media with the features of a sparse floating cilia of very light density and a subsequent high density base to catch large disruptive particles.

FIG. 1 is a block diagram of some embodiments of the present invention, setting forth the parameters of some present invention three dimensional filter media for extended life filters. It includes block 1 three dimensional filter media, block 3 filter media base (synthetics, natural, or combo fibers) and block 5 woven or knitted. It further includes block 7 multiple mechanical cilia (at least 10 times longer than filter media base thickness), block 9 protruding outwardly and away from base (attached to base or cut from base) and block 11 thickness of 0.02 to 0.075 inches. It also includes block 13 woven or knitted fabric cut to create elongated cilia, block 15 woven or knitted fabric with elongated cilia glued, welded, or otherwise connected to base, and block 17 multiple uses (HVAC filters, vacuum filters, respiratory filters, etc).

Figure 2:
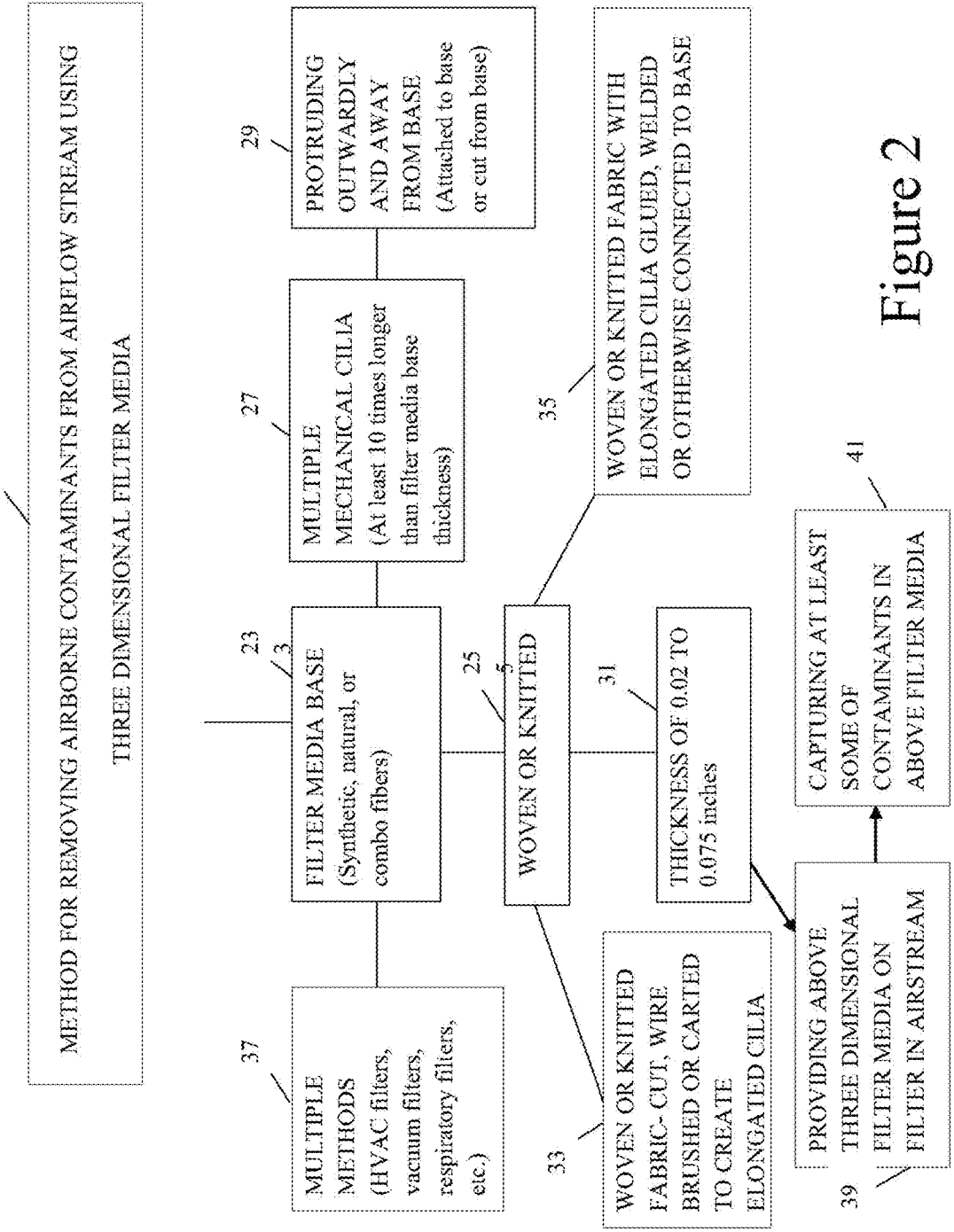
FIG. 2 is a block diagram of some embodiments of the present invention, setting forth details of some present invention three dimensional filter media options and alternatives.

FIG. 2 is a block diagram of some embodiments of the present invention, setting forth details of some present invention three dimensional filter media methods. It includes block 21 method for removing airborne contaminants from airflow stream using three dimensional filter media, block 23 filter media base (synthetic, natural, or combo fibers), block 25 woven or knitted and block 27 multiple mechanical cilia (at least 10 times longer than filter media base thickness). It further includes block 29 protruding outwardly and away from base (attached to base or cut from base), block 31 thickness of 0.02 to 0.075 inches, block 33 woven or knitted fabric cut to create elongated cilia and block 35 woven or knitted fabric with elongated cilia glued, welded or otherwise connected to base. It also includes block 37 multiple methods (HVAC filters, vacuum filters, respiratory filters, etc), block 39 providing above three dimensional filter media on filter in airstream and block 41 capturing at least some of contaminants in above filter media.

Figure 3:
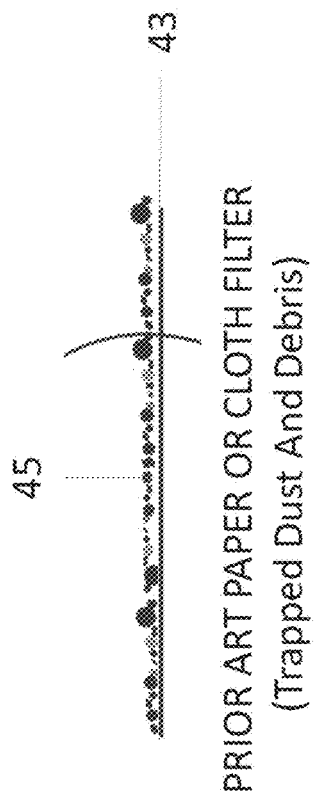
FIG. 3 is a side cut view of a prior art paper or cloth filter with trapped dust and debris.

FIG. 3 is a side cut view of a prior art paper or cloth filter with trapped dust and debris. Prior art filter 43 has no extremely elongated cilia and acts in only two dimensions—its width and length, and traps debris 45 accordingly. As shown, debris 45 is tightly packed and entrapped and readily clogs filter 43.

Figure 4:
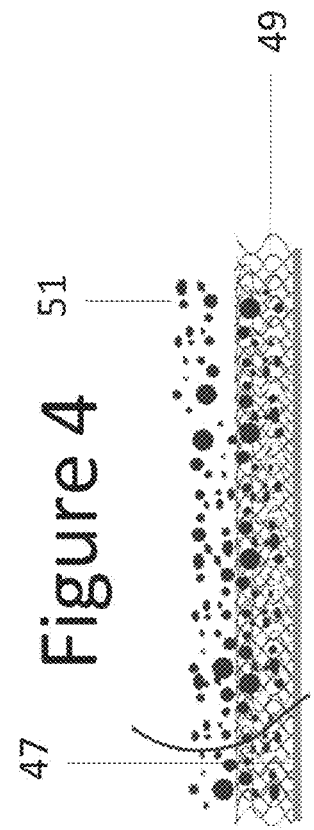
FIG. 4 is a present invention woven or knitted filter media with extended cilia and suspended dust and debris.

FIG. 4 is a present invention woven or knitted filter media 47 with extended cilia 49 and suspended dust and debris 51. It can be seen here that debris 51 is suspended with air flow routes able to traverse the debris 51. This enable continued air flow even after significant debris has been filtered.

Figure 5:
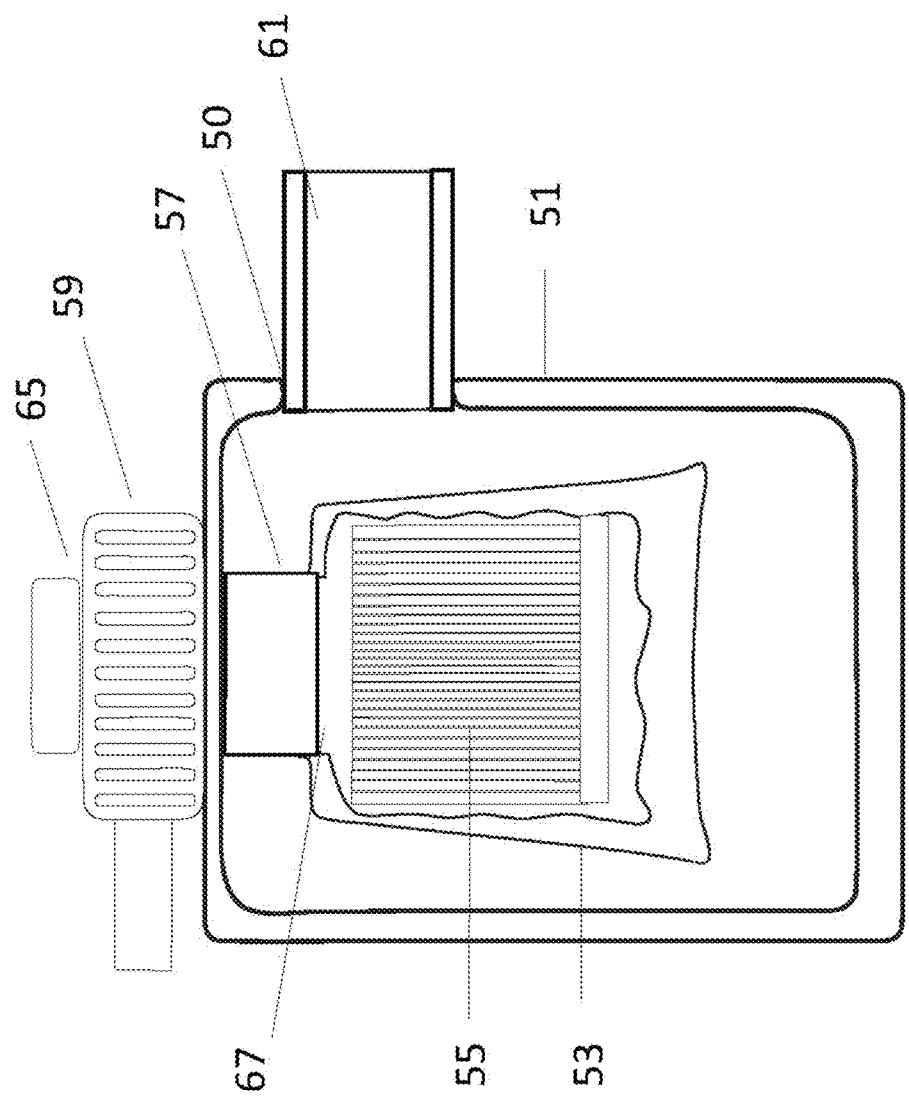
FIG. 5 is a front, partially cut view of one embodiment of a present invention three dimensional filter media shown being used as a filter.

FIG. 5 is a front, partially cut view of one embodiment of a present invention three dimensional filter media shown being used as a filter in a vacuum cleaner. In FIG. 3, basic vacuum cleaner 50 has a housing 51 with a portion being a canister 53 inside. The canister 53 is typically plastic or other structure. There is a present invention filter media 55 inside canister 53 and connected to canister outlet 57. There is also an attachment means shown as elastic band 67 (but could be a snap ring, or any other attachment means). When operating, the motor 59 pulls air out of the canister 53, thereby pulling dirt and debris into canister 53 via canister inlet 61. The dirt and debris enter the canister 53 and remain there as present invention filter media 55 collects and holds some of the dirt and debris against its surface when the vacuum cleaner motor 59 is on (control 65 is the on/off switch). When the vacuum cleaner is off, the present invention filter media 55 relaxes and the debris and dirt falls off.

Figure 6:
FIG. 6 is a front view of one side of a woven fabric that does not include present invention cilia features, and thus is the same as both sides of a prior art woven fabric, as well as the uncut (non-cilia) side of a present invention three dimensional filter media.

FIG. 6 is a front view of one side of a woven fabric that does not include present invention cilia features, and thus is the same as both sides of a prior art woven fabric, as well as the uncut (non-cilia) side of a present invention three dimensional filter media.

FIG. 7 is a front view of one side of a present invention filter media knitted fabric, being the uncut (non-cilia) side of a present invention three dimensional filter media on which the opposite side, shown in FIG. 8 below, contains the cilia.

FIG. 8 is the opposite side view of the present invention three dimensional filter media shown in FIG. 7 wherein the in-focus cilia are more than twenty times longer than the thickness of the out-of-focus knitted base behind the cilia.

FIGS. 9 and 10 show present invention three dimensional filter media cilia prior to use and after many uses, respectively, wherein the well used media of FIG. 10 has collected gypsum board powder at interstices in front of and away from the base and within the random three dimensional "spaghetti" cilia, thus showing large majority of flow space remaining open after many uses. The cilia are in focus and the base is behind the cilia out of focus. In focus debris confirms that it is suspended in the cilia and not embedded in the base.

Table I below illustrates the improvements achieved with the present invention filter media, of the present invention is employed as compared to an Original Equipment Manufacturer (OEM) filter. In summary, some of the important features of the present invention filter media are shown in Table I:

TABLE I

| | Primary or OEM filter alone | Present Invention 3D filter media |
|---|---|---|
| Washability | The construction of the OEM filter is ridged, folded media made of materials that are not | The present invention filter with elongated cilia is construction of knitted or woven fabric that is |

TABLE I-continued

| | Primary or OEM filter alone | Present Invention 3D filter media |
|---|---|---|
| | expected to be wetted. Attempts to remove particles by washing can cause the filter to fall apart. It can also convert the fine debris from a powder to a self-hardening mud like compound such as is the case with plaster or concrete. When this happens the filter can become totally excluded and totally clogged and must be discarded and replaced. | washable by hand or in a washing machine. The interaction of the washing process with the filter media regenerates the filter media to its original state. The action of soap and water is effective to dissolve and/or and remove any remaining particles by dissolving and or floating the debris particles away. |
| Filter types | Disposable, designed to be discarded and replaced. Generally difficult or impossible to clean. | Reusable, cleanable, designed for many uses. |
| Reaction to accelerations. Filters are frequently jarred by slamming them against a hard surface; the slamming action dislodges the debris from the surface. It is analogous to what happens to a person when their vehicle strikes a brick wall. | The filter does not react to this well because the mass of the debris particles is so small that slamming the filter against a hard surface does not produce acceleration necessary to produce a force of sufficient magnitude to dislodge the particle. One might use the analogy of a jamming a ground ball into an unyielding square passage. The wedging action produce a very high clamping and holding forces | The retention of particles by a soft and very flexible media, such as a knitted fabric, is facilitated by the debris being stopped by the soft fabric surface and or becoming lodged in the spaces between the fibers. The cilia hold debris differently by suspending debris in the spaghetti mix of cilia. Shaking dislodges most debris, and jarring helps further. Both the base and the cilia of the media experience stretched and changed shapes. These changes in size and shape can increase the particle trapping capacity of the media by adjusting to the increased pressure drop. The debris becomes part of the filtering mechanism and the ability of the fabric to yield adjusts the pressure drop as to maintain the flow. And debris release is much easier. |
| Reaction to turning the vacuum source on and off. The normal operation of a vacuum cleaner involves turning it on to pick up and remove debris and turning it off when the task is done. The reaction of the two types of filters is described | The ridged system holds trapped particle is a ridged, unyielding matrix. This means that it does not react to the fact that the vacuum is on or off. The particles that are stacked on top of the trapped or wedged particles are held in place by the vacuum force when the motor is on. When the motor is turned off these particles are not held in place by vacuum and depending on static charge, stickiness and wedging characteristics they are free to fall off the face of the filter. | The flexible nature of the Filter media allows the filter surface and the cilia to react to the change in vacuum pressure. When the vacuum is turned on the flexible filter and streaming cilia will tend to take the shape of any supporting structure, e.g., the OEM filter. When the vacuum is turned off, the filter bag will tend to return to a relaxed state which changes is shape and size. This change has the effect of loosening and dislodging the particles that have been deposited and held in place by the presence of vacuum force. Therefore, the turning off of the vacuum pressure causes a change in shape and size of the filter surface which tends to release a much larger amount of the trapped particles. The result is that the flexible media is self-cleaning to a much greater degree than the ridged media. Stretching and/or shaking the media when the vacuum is turned off will result in most of the debris falling off, which can restore or regenerate the filter to its "clean state" capacity. |

As examples of use of present invention devices, hundreds of users received products and some sent back testimonials. Following are samples of these testimonials in support of superiority over conventional filters. These users applied the present invention (fleece) filter media with cilia to various models of vacuum cleaners. The advertising indicated that these (present invention) products filtered better and lasted longer than conventional filters:

| DATE OF FEEDBACK | COMMENTS |
| --- | --- |
| Sep. 1, 2016 | Good. |
| Aug. 17, 2016 | Great product. |
| Jul. 31, 2016 | Filter works great, arrived quickly, should save tons of money. |
| Jul. 29, 2016 | Very satisfied. |
| Jul. 18, 2016 | Great seller! |
| Jul. 17, 2016 | Good. |
| Jul. 13, 2016 | Fits perfectly. |
| Jul. 7, 2016 | As advertised. |
| Jun. 29, 2016 | Works well. |
| Jun. 27, 2016 | Product as advertised. |
| Jun. 20, 2016 | Arrived quickly, product appeared as advertised. Works great. I hope it extends the life of my filter. |
| Jun. 19, 2016 | This is a fabulous product. The suction power is the same. What I really like about this product is two-fold, helping the environment by providing a product that stops wastefulness and cost effectiveness for consumers not having to purchase additional filters. |
| Jun. 6, 2016 | Very good. |
| May 31, 2016 | Worked great, fit my 16 Gal, 5 HP Rigid vacuum perfectly! |
| May 22, 2016 | Great price, fast delivery. The filters are effective and economical. |
| May 19, 2016 | As described, works as advertised. |
| May 18, 2016 | I put this on my Craftsman wet/dry vac and it works awesome. I have vacuumed out my garage 3 times now and after cleaning it out I didn't even have to knock out the filter like I used to after 1 cleaning of my garage. I am going to buy another for my wall vac and I suggest it to all my friends. |
| May 15, 2016 | I received this item well ahead of schedule, several days, in fact which was a pleasant surprise. I am totally revamping the shop vac and didn't want to use it with its brand new filter until this item was in place. Item showed up early and my car is now so nicely vacuumed. Would use this seller again! Thank you!! |
| May 15, 2016 | Excellent product. |
| May 13, 2016 | My maintenance team uses this. |
| May 5, 2016 | Satisfied. |
| May 5, 2016 | Satisfied. |
| May 4, 2016 | Works well. |
| May 4, 2016 | Good product. As described. |
| Apr. 20, 2016 | No problem with transaction |
| Apr. 29, 2016 | Great product. My vacuum cleaner has good power much longer because the filter is not clogging that fast. I am using it in a vacuum that is used for drywall sanding and it works awesome. Easy to clean. |
| Apr. 29, 2016 | Great idea to protect the paper filter on the shop vac. Very easy to clean. Will save money in the long run and protect the land fill from all those paper filters. |
| Apr. 27, 2016 | Wow! This really works great! I am very pleased with this purchase. Somewhat expensive I thought, but when I began using it, I was amazed how well it worked. I did not have to clean my filter out after a particularly dusty and dirty vac job at a site . . . Just removed the filter and washed & dried it, and put it back on. Will obviously save me from filter repurchases quite a bit. |
| Apr. 27, 2016 | As advertised. |
| Apr. 27, 2016 | Just what I wanted. A+++++ seller. |
| Apr. 26, 2016 | Perfect, as advertised, 5 stars ++++. |
| Aug. 19, 2016 | Fit my Sears shop vac perfectly. A real saver on filters. |
| Aug. 2, 2016 | Just take it out, wash, and reinstall. original filter is still in new condition. |
| Aug. 2, 2016 | Good product, fast shipping. |
| Jul. 1, 2016 | Great idea! |
| Jun. 27, 2016 | Saves me money for sure. |
| Apr. 30, 2016 | Works great, and preserves your shop vac filter. It does need to be cleaned/shaken out somewhat frequently, although actual machine washing has not been necessary yet (as of 60 days of ownership) Biggest money saver on Amazon. |
| Mar. 27, 2016 | The filter underneath has remained pristine. I have not yet laundered the Filterpal, which I suppose will happen once I have filled my six gallon shop vac. |
| Mar. 12, 2016 | Just a great product, save a lot of money and highly recommend. |
| Mar. 1, 2016 | Amazing! Canister full, took filterpal off and filter under it was still clean! |
| Feb. 19, 2016 | Great product . . . exactly as advertised . . . super fast delivery! |
| Feb. 9, 2016 | Great idea. I have been making lots of fine dust cutting MDF and sanding sheet rock. The bag appears to be clogged by the vac is still working fine and the dust comes off easily by gentle hand brushing into a trashcan. |
| Feb. 9, 2016 | Seems to be doing its job well, no loss of suction from what I can tell |
| Jan. 25, 2016 | Was easy to clean and kept my paper filter pristine. Have had it installed for several months now, and only cleaned it once, and only because I was being anal that day. |
| Jan. 23, 2016 | These are a great idea. I don't notice any change in power of suction for the vacuum and they sure help when it comes to the expense of replacing the normally very expensive filters that go with most shop vac type vacuums. Easy to put on and easy to take off and wash. |
| Jun. 20, 2016 | If you want your filter to last long, you can't go wrong with the Filterpal. I mean it. Works like a charm, if it gets dirty you just throw it to the washing machine. |

Although not a formal study, the foregoing establishes the efficacy and superiority of the present invention filter media compared to conventional filters based on independent third party users.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

The invention claimed is:

1. A three dimensional filter media for extended life filters, which comprises:
    (a) a filter media base made of fabric selected from the group consisting of synthetic fabric, natural fabric and combinations thereof, said fabric being made of a plurality of threads, each of said plurality of threads being formed by a plurality of joined twisted thread filaments, said fabric being selected from the group consisting of woven fabric, knitted fabric, and combinations thereof, said fabric having a thickness of Z, wherein Z is in the range of 0.020 to 0.075 inch, said fabric having a density of D, including interstices, wherein D is in the range of 0.25 to 0.50 gms/cubic inch; and
    (b) a plurality of mechanical cilia connected to and protruding outwardly and away from said base, said cilia having an average length that is at least 10 times Z, Z being the thickness of said base set forth above, and having a density that is no greater than 5% of D, D being the density of said base set forth above, wherein said cilia are located on only one side of said filter media base.

2. The three dimensional filter media for extended life filters of claim 1, wherein said filter media base and said mechanical cilia are made of synthetic fabric selected from the group consisting of polyester, polypropylene, polyethylene, polyvinyl chlorides and combinations thereof.

3. The three dimensional filter media for extended life filters of claim 1, wherein said base is a knitted fabric.

4. The three dimensional filter media for extended life filters of claim 1, wherein said cilia are one end severed filaments of said base.

5. The three dimensional filter media for extended life filters of claim 1, wherein said cilia have a length of at least 20 times Z, wherein Z is the thickness of said base set forth above.

6. The three dimensional filter media for extended life filters of claim 1, wherein said cilia have a density that is no greater than 2% of D, D being the density of said base set forth above.

7. The three dimensional filter media for extended life filters of claim 1, wherein said cilia are non-parallel and create passage areas in the range of one micron to 0.2 inch.

8. The three dimensional filter media for extended life filters of claim 1, wherein said cilia are non-parallel and create passage areas in the range of one micron to 0.01 inch.

9. The three dimensional filter media for extended life filters of claim 1, wherein the plurality of mechanical cilia are random three dimensional cilia.

10. The three dimensional filter media for extended life filters of claim 1, wherein the three dimensional filter media is washable and reusable.

* * * * *